United States Patent
Bonnano et al.

(10) Patent No.: US 10,686,370 B1
(45) Date of Patent: Jun. 16, 2020

(54) FLYING CAPACITOR BALANCING IN A MULTI-LEVEL VOLTAGE CONVERTER

(71) Applicants: Infineon Technologies AG, Neubiberg (DE); Universitádi Padova Dipartmento di Ingegneria dell'Informazion (DEI), Padua (IT)

(72) Inventors: Giovanni Bonnano, Villach (AT); Matteo Agostinelli, Udine (IT); Luca Corradini, Padua (IT); Abdelhamid Eslam, Padua (IT); Paolo Mattavelli, Padua (IT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/219,147

(22) Filed: Dec. 13, 2018

(51) Int. Cl.
*H02M 3/07* (2006.01)
(52) U.S. Cl.
CPC .................................... *H02M 3/07* (2013.01)
(58) Field of Classification Search
CPC ...................................................... H02M 3/07
See application file for complete search history.

(56) References Cited

U.S. PATENT DOCUMENTS

| | | | |
|---|---|---|---|
| 10,090,763 B1* | 10/2018 | Mercer | H02M 3/1582 |
| 2014/0266134 A1* | 9/2014 | Zhak | H02M 1/36 323/311 |
| 2015/0280608 A1* | 10/2015 | Yoscovich | H02M 7/483 363/131 |
| 2016/0268924 A1* | 9/2016 | Fu | H02M 7/483 |

* cited by examiner

Primary Examiner — Jue Zhang
Assistant Examiner — Kevin H Sprenger
(74) Attorney, Agent, or Firm — Schiff Hardin LLP

(57) ABSTRACT

A multi-level voltage converter having a first switching circuit including a flying capacitor coupled in parallel with first switches coupled in series, the first switches configured to be driven by a first duty command having a first duty cycle; a second switching circuit including the flying and second switches coupled in series between input voltage terminals of an input voltage, the second switches configured to be driven by a second duty command having a second duty cycle; and a control circuit configured to balance a voltage of the flying capacitor by controlling an interleaved constant frequency modulator to generate the first and second duty cycle commands such that the first and second duty cycles are the same.

15 Claims, 6 Drawing Sheets

Three-Level Voltage Converter with Control Circuit

Figure 1
Three-Level Voltage Converter with Control Circuit

Figure 2A
Voltage Converter
(Control Circuit with Angle Modulation)

Figure 3A
Voltage Converter
(Control Circuit with Peak Offset Modulation)

Figure 4

FLYING CAPACITOR BALANCING IN A MULTI-LEVEL VOLTAGE CONVERTER

BACKGROUND

Multi-level step-down voltage converters have more than two switches and one or more flying capacitors as a switching stage, and an inductor-capacitor (LC) filter as an output stage.

A drawback of these converters is an intrinsic instability of the flying-capacitor voltage under Peak Current Mode Control (PCMC). The instability associated with the flying-capacitor voltage in PCMC should not be confused with sub-harmonic oscillations, which is also found in step-down converters under PCMC, and can be suppressed using a compensation ramp. The flying-capacitor voltage instability is a separate phenomenon which naturally occurs under PCMC, and also under voltage-mode control, whenever there is a mismatch between switching groups or their driving signals. Flying capacitor voltage unbalance does not occur in a multi-level converter under Valley Current Mode Control (VCMC).

DETAILED DESCRIPTION

Aspects of the current disclosure are directed to sensorless control to overcome instability associated with flying capacitor voltage runaway in Peak Current Mode Controlled (PCMC) multi-level flying capacitor voltage converters. A controller of this disclosure balances the flying capacitor voltage by controlling an interleaved constant frequency modulator to generate first and second duty cycle commands of respective first and second switching circuits of the voltage converter such that the duty cycle error is compensated. "Sensorless" means that the control is based on information already available, in this case, the duty cycle difference; no additional measurements are required. The controller may use either of two different types of control to remove the unbalance: (1) modulation of a phase angle between duty cycle commands used to drive switching circuits; or (2) modulation of peak current offset of PCMC.

Figure 1:
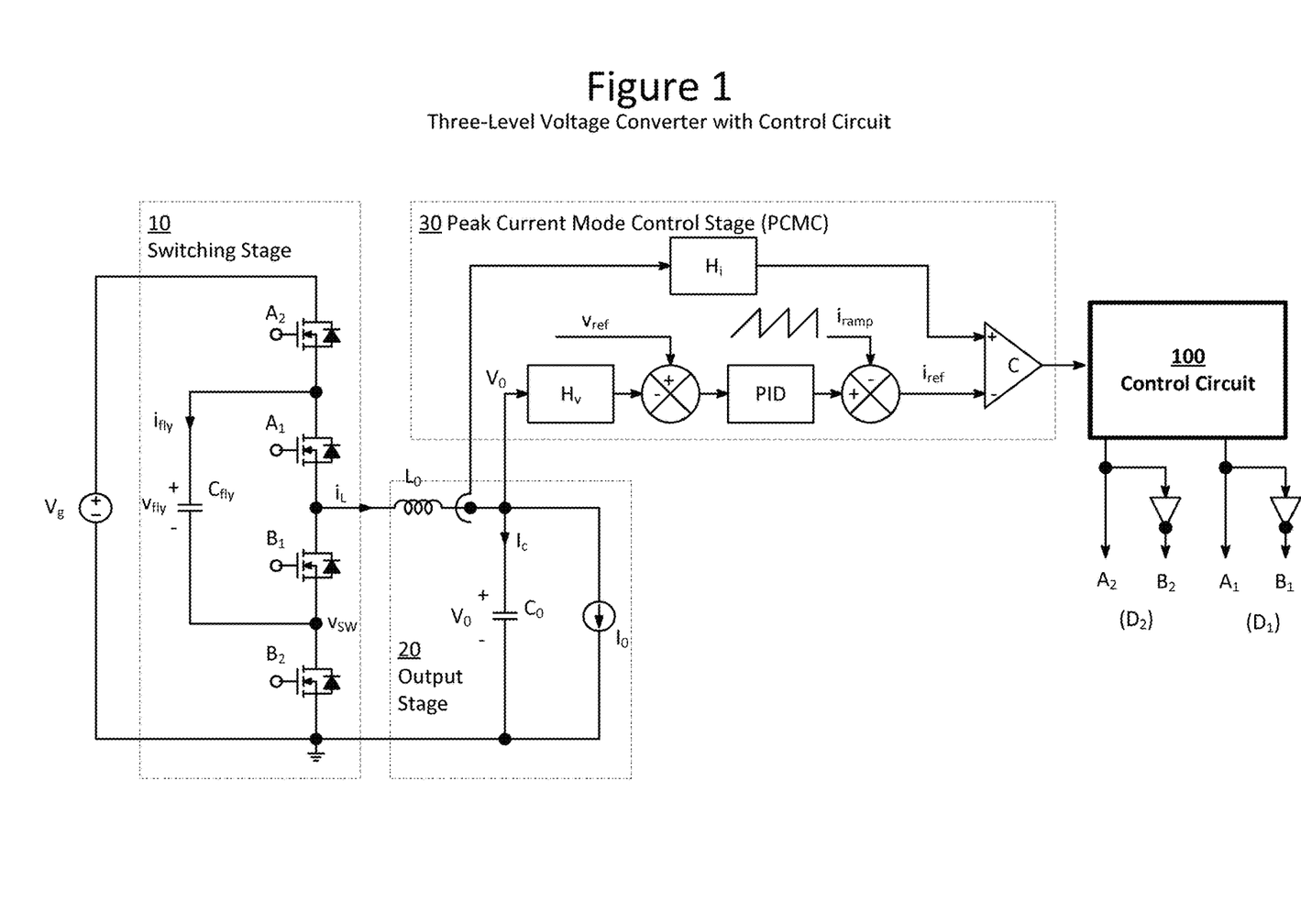
FIG. 1 illustrates a schematic diagram of a voltage converter with control circuit in accordance with aspects of the disclosure.

FIG. 1 illustrates a schematic diagram of a voltage converter with control circuit 100 in accordance with aspects of the disclosure.

The voltage converter in this example is a three-level Buck voltage converter. The voltage converter comprises an input voltage $V_g$, a switching stage 10, an output stage 20, a peak current mode control stage 30, and a control circuit 100.

The switching stage 10 comprises a first switching circuit and a second switching circuit. The first switching circuit includes a flying capacitor $C_{fly}$ coupled in parallel with first switches $A_1$, $B_1$ coupled in series. The first switches $A_1$, $B_1$ are configured to be driven by a first duty command $D_1$ having a first duty cycle. The second switching circuit includes the flying capacitor $C_{fly}$ and second switches $A_2$, $B_2$ coupled in series between input voltage terminals of the input voltage $V_g$. The second switches $A_2$, $B_2$ are configured to be driven by a second duty command $D_2$ having a second duty cycle. The second switches $A_2$, $B_2$ are driven by a same input Pulse Width Modulation (PWM) signal, while the first switches $A_1$, $B_1$ are driven by a PWM signal which is shifted in phase by 180°.

The output stage 20 comprises an inductor $L_o$, an output capacitor $C_o$, and a load current $I_o$.

The PCMC stage 30 mode, as is known, turns on the duty command $D_1/D_2$ and starts the charging of the inductor $L_0$ at a fixed frequency, and turns off the inductor current $i_L$ when the inductor current $i_L$ crosses a peak reference current $i_{ref}$. In other words, when a comparator C determines that the sensed inductor current $i_L$ and the peak reference current $i_{ref}$ are equal, a PWM signal is reset to zero. The set is provided periodically by a clock frequency clk so the PWM signal goes high (to logic 1) at a fixed frequency.

Operations of the switching stage 10, output stage 20, and PCMC stage 30 are known. For the sake of brevity, their detailed descriptions are omitted here.

The PCMC stage 30 of a conventional three-level voltage converter under a flying capacitor voltage disturbance induces two different duty commands $D_1$ and $D_2$ fed to the respective first and second switching circuits ($A_1$, $B_1$), ($A_2$, $B_2$). The duty commands are the PWM signal. A difference between these duty commands $D_1$, $D_2$ leads to flying capacitor voltage instability due to flying capacitor voltage runaway. The flying capacitor voltage runaway is induced by an inherent positive feedback action on the flying capacitor voltage $V_{fly}$ imposed by the PCMC.

The control circuit 100 of this disclosure is configured to sense the duty cycle difference, which is induced by the PCMC. The control circuit 100 applies a control action based on the duty cycle difference in order to compensate for a variation in the charging and discharging times of the flying capacitor $C_{fly}$ leading to the flying capacitor voltage runaway. Hence, a goal of the controller 100 is to force the duty cycles of the duty commands $D_1$, $D_2$ to be equal. Since the average of the flying capacitor current $i_{fly}$ is proportional to the duty cycle difference, such control forces the flying capacitor average current to zero at steady state. The controller 100 will not only eliminate the instability of the flying capacitor voltage $V_{fly}$, but will also inherently achieve flying capacitor voltage balancing. The flying capacitor voltage $V_{fly}$ is balanced when equal to a voltage converter input voltage $V_g$ divided by (N−1), where N is a number of voltage levels of the voltage converter.

This disclosure describes the control circuit 100 as applied to a three-level Buck converter, that is, a voltage converter with one flying capacitor and four switches. However, the disclosure is not limited in this respect. The disclosed control circuit 100 is applicable to any type of multi-level voltage converter with any number of flying capacitors and switches. The greater the number of voltage levels, the greater the number of duty cycles. In general, an N-level converter has N−1 duty cycles.

The control circuit 100 will be described in more detail below. FIGS. 2A-2D are directed to a control circuit 200 that is configured to control the duty cycle difference to be equal based on angle modulation. FIGS. 3A-3D are directed to a control circuit 300 that is configured to control the duty cycle difference to be equal based on peak offset modulation.

Figure 2A:
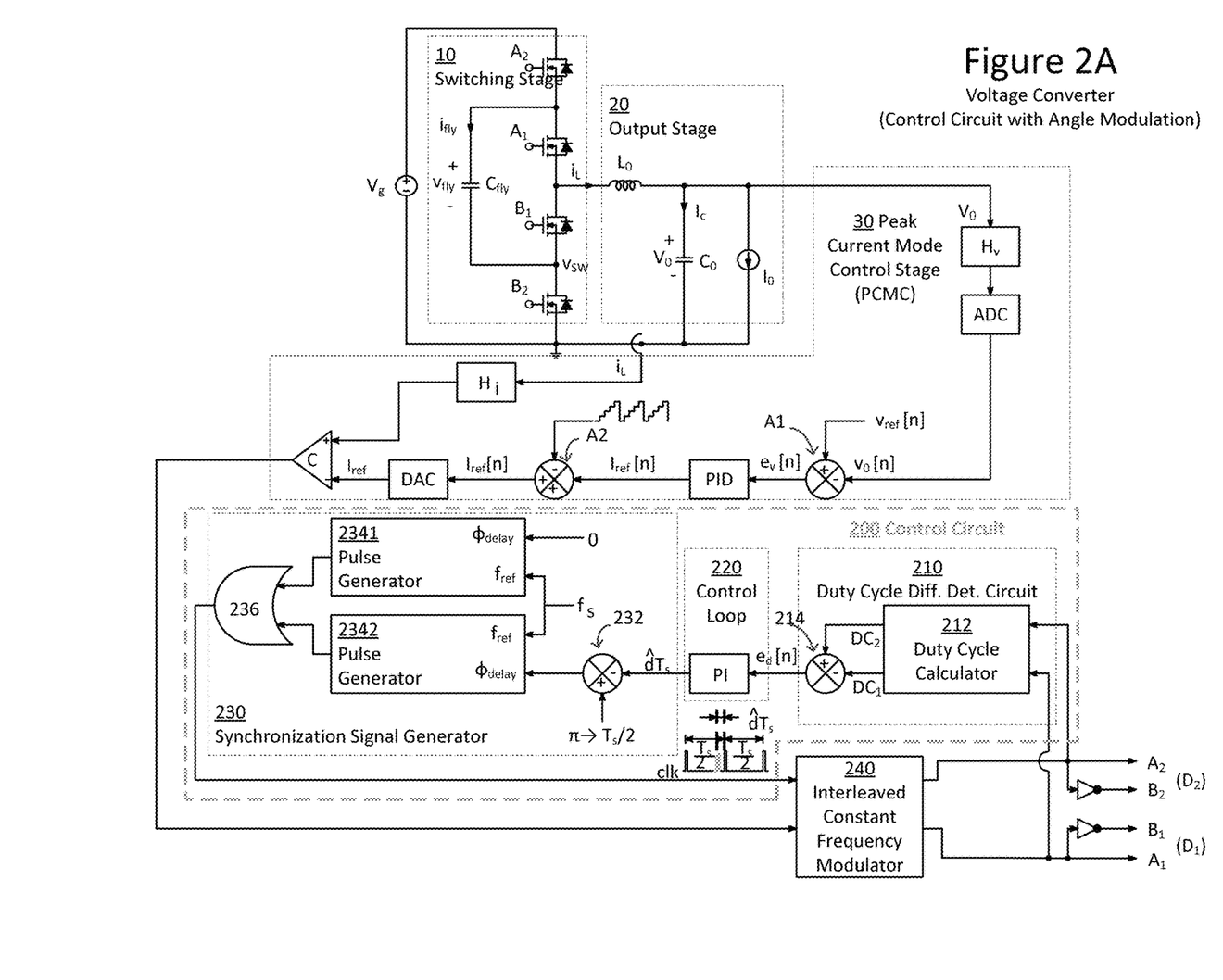
FIG. 2A illustrates a schematic diagram of a voltage converter with a control circuit, which includes an angle modulation circuit, in accordance with aspects of the disclosure.

FIG. 2A illustrates a schematic diagram of a voltage converter with details of the control circuit 200, which includes an angle modulation circuit, in accordance with aspects of the disclosure.

By way of overview, the control circuit 200 having the angle modulation circuit is configured to control the interleaved constant frequency modulator 240 by adjusting, based on a duty cycle difference $e_d[n]$ between the first and second duty cycles $DC_1$, $DC_2$, a phase angle difference between the first and second duty commands $D_1$, $D_2$.

The voltage converter, which in this example is a three-level voltage converter, has three degrees of freedom that can be controlled. The first and the second degrees are the duty commands $D_1$, $D_2$ of the respective switching circuits $(A_1, B_1)$, $(A_2, B_2)$, which are used for regulation of the output voltage $V_O$. The phase angle difference between the switching circuits $(A_1, B_1)$ and $(A_2, B_2)$, which is nominally set to n to generate output ripple at a frequency equal to twice that of the switching frequency $f_s$, is the third degree of freedom. The phase angle modulation of control circuit 200 uses this third degree of freedom to eliminate the positive feedback behavior discussed above.

The angle modulation circuit of the control circuit 200 comprises a duty cycle difference determination circuit 210, a control loop 220, and a synchronization signal generator 230. There is also a known interleaved constant frequency modulator 240.

The duty cycle difference determination circuit 210 comprises a duty cycle calculator 212 and an adder 214. The duty cycle calculator 212 is configured to calculate the first and second duty cycles $DC_1$, $DC_2$ of the respective first and second duty commands $D_1$, $D_2$. The adder 214 is configured to subtract the duty cycles $(DC_2-DC_1)$ and output a duty cycle difference $e_d[n]$.

The control loop 220 is configured to generate a delay time $\hat{d}T_s$ based on the duty cycle difference $e_d[n]$.

The synchronization signal generator 230 is configured to generate first and second synchronization signals to control the interleaved constant frequency modulator 240 to generate the respective first and second duty commands $D_1$, $D_2$. The synchronization signal generator 230 comprises adder 232, pulse generator 2341, pulse generator 2342, and OR gate 236.

Normally first and second synchronization signal pulses are interleaved by 180°, that is, one of the generated signal pulses would have a 0° phase delay $\phi_{delay}$, and the other would have a 180° (n) phase delay $\phi_{delay}$. The adder 232 is configured to subtract the delay time $dT_s$, which is based on a difference between the duty cycles $(DC_2-DC_1)$, from this normal 180° (n) phase delay $\phi_{delay}$ and thus introduce a change in the phase shift between the two signal pulses to be output by the two pulse generators 2341, 2342.

The pulse generators 2341, 2342 are configured to generate respective synchronization signals that will be statically interleaved by time $T_s/2$. The OR gate 236 then combines the synchronization signals in order to generate a clock pulse signal which is applied to a flip-flop set input (not shown) in the interleaved constant frequency modulator 240.

The interleaved constant frequency modulator 240, which is known, generates an interleaved version of gate signal pulses for the first switching circuit $(A_1, B_1)$ and the second switching circuit $(A_2, \text{and } B_2)$. The two gate signal pulses are for the two respective phases of the switching cycle.

To validate the control to compensate for the positive feedback action, the forced duty commands after considering a generic time shift $$\frac{T_s}{2} - \hat{d}T_s$$

are given by:

$$D_1|_{forced, M<0.5} = D_1|_{M<0.5} + \frac{\hat{d}\left(0.5 - \frac{\hat{V}_{fly}}{V_g}\right)\left(\frac{S_e L_o}{V_g} - M\right)}{0.25 - M - \left(\frac{\hat{V}_f}{V_g}\right)^2 + \frac{S_e L_o}{V_g}}, \quad \text{(Equation 1)}$$

$$D_2|_{forced, M<0.5} = D_2|_{M<0.5} - \frac{\hat{d}\left(0.5 + \frac{\hat{V}_{fly}}{V_g}\right)\left(\frac{S_e L_o}{V_g} - M\right)}{0.25 - M - \left(\frac{\hat{V}_f}{V_g}\right)^2 + \frac{S_e L_o}{V_g}}, \quad \text{(Equation 2)}$$

$$D_1|_{forced, M>0.5} = D_1|_{M>0.5} - \frac{\hat{d}\left(0.5 - \frac{\hat{V}_{fly}}{V_g}\right)\left(1 - M + \frac{S_e L_o}{V_g}\right)}{0.75 - M + \left(\frac{\hat{V}_f}{V_g}\right)^2 + \frac{S_e L_o}{V_g}}, \quad \text{(Equation 1)}$$

and $$D_2|_{forced, M>0.5} = D_2|_{M>0.5} - \frac{\hat{d}\left(0.5 + \frac{\hat{V}_{fly}}{V_g}\right)\left(1 - M - \frac{S_e L_o}{V_g}\right)}{0.75 - M + \left(\frac{\hat{V}_f}{V_g}\right)^2 + \frac{S_e L_o}{V_g}}, \quad \text{(Equation 2)}$$

which lead to the approximated flying capacitor average current given by:

$$I_{fly}|_{PCMC, M<0.5} \approx \frac{M \frac{\hat{V}_{fly}}{V_g}}{0.25 - M + \frac{S_e L_o}{V_g}} \left[I_o - \frac{\Delta I_L M}{2(0.5 - M)}\right] - \quad \text{(Equation 5)}$$

$$\hat{d}\left[\frac{M^2 V_g \left(0.5 - M + \frac{S_e L_o}{V_g}\right)}{2L_o f_s \left(0.25 - M + \frac{S_e L_o}{V_g}\right)} + \frac{I_o \left(\frac{S_e L_o}{V_g} - M\right)}{0.25 - M + \frac{S_e L_o}{V_g}}\right],$$

and $$I_{fly}|_{PCMC, M>0.5} \approx \frac{(1-M)\frac{\hat{V}_{fly}}{V_g}}{0.75 - M + \frac{S_e L_o}{V_g}} \left[I_o - \frac{(1-M)\Delta I_L}{2(M - 0.5)}\right] - \quad \text{(Equation 6)}$$

$$\hat{d}\left[\frac{V_g(1-M)^2 \left(0.5 - M + \frac{S_e L_o}{V_g}\right)}{2L_o f_s \left(0.75 - M + \frac{S_e L_o}{V_g}\right)} + \frac{I_o \left(1 - M + \frac{S_e L_o}{V_g}\right)}{0.75 - M + \frac{S_e L_o}{V_g}}\right].$$

Accordingly, the angle modulation is inherently stable since $$S_e \geq \frac{V_g}{2L_o}. \quad \text{(Equation 7)}$$

At steady state operating point $D_2=D_1=M$, where M is the converter voltage conversion ratio, flying capacitor voltage $$\hat{V}_{fly} = \frac{V_g}{2},$$

flying capacitor average current $I_{fly}=0$, and interleaving time correction $\hat{d}=0$. The values of time correction $\hat{d}$, duty cycle difference, and flying capacitor average current are zero at steady state.

Figure 2B:
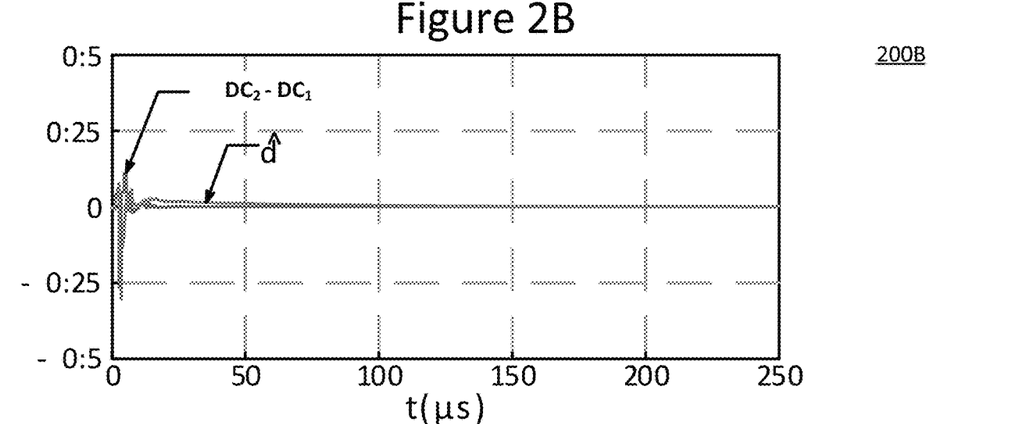
FIGS. 2B-2D illustrate graphs of simulation results of the voltage converter with control circuit of FIG. 2A.
Figure 2C:
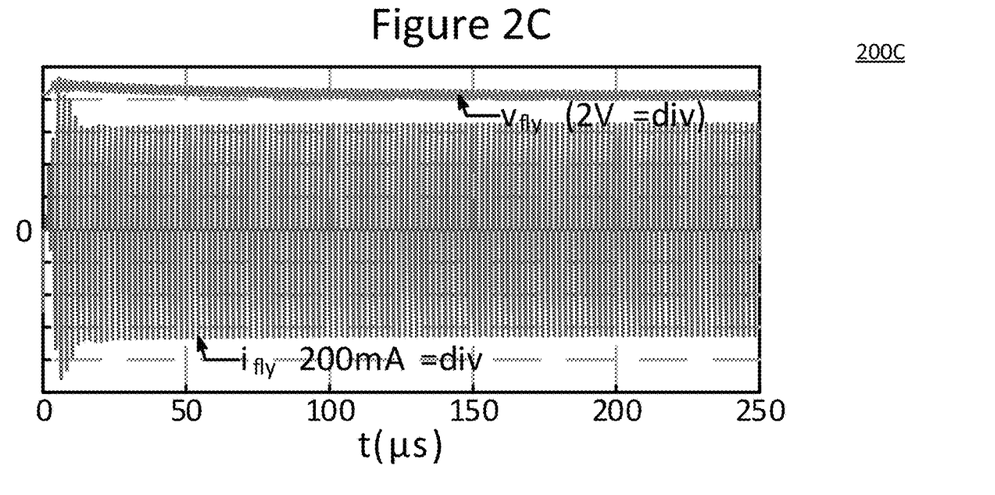
Figure 2D:
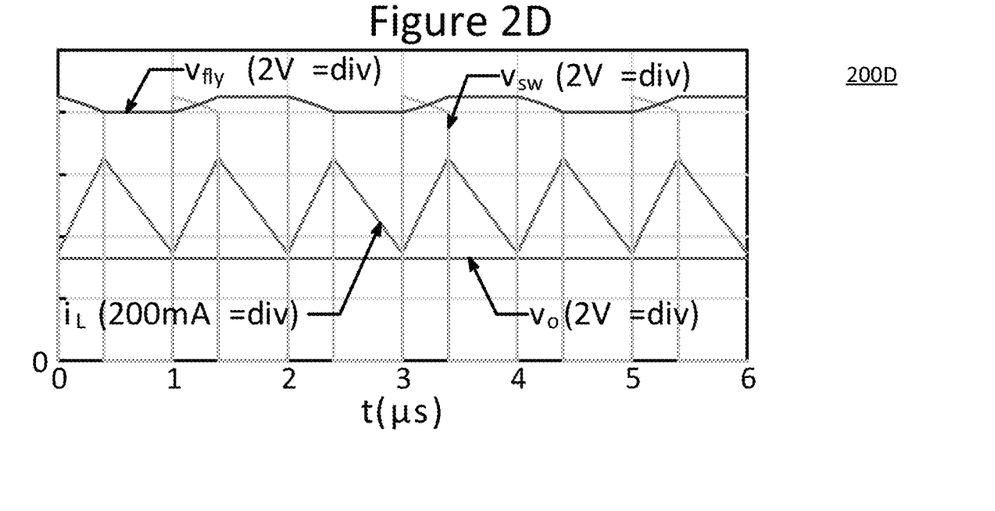

FIGS. 2B-2D illustrate simulation results of the voltage converter with the control circuit 200 of FIG. 2A. FIG. 2B illustrates a graph 200B showing the duty cycle difference $DC_2-DC_1$ and the delay d in the phase shift between the two phases. FIG. 2C illustrates a graph 200C showing a flying capacitor voltage $V_{fly}$ and flying capacitor current $i_{fly}$. FIG. 2D illustrates a graph 200D showing steady state waveforms of the switching node voltage $v_{sw}$, inductor current $i_L$, output voltage $v_o$, and flying capacitor voltage $v_{fly}$.

Figure 3A:
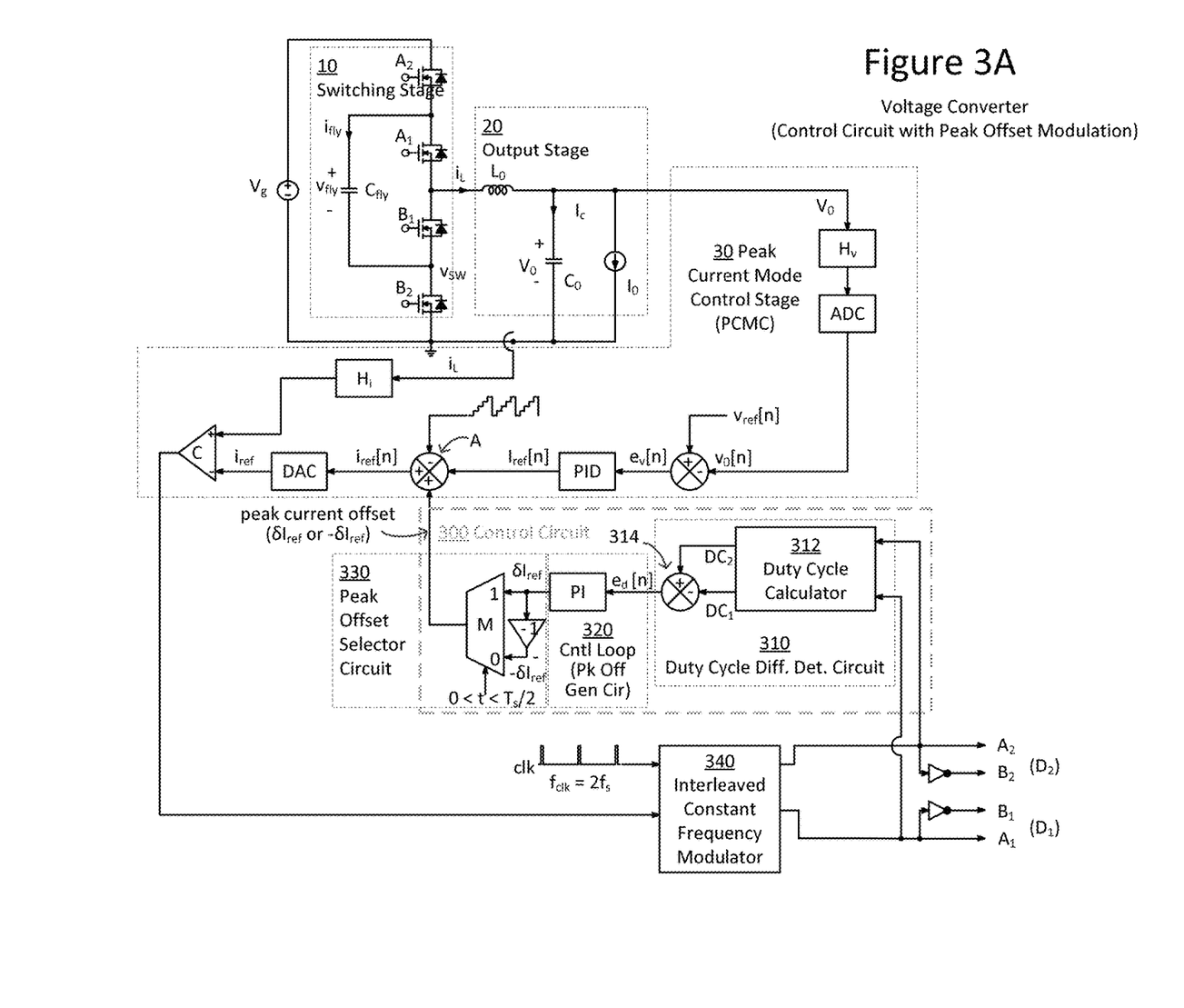
FIG. 3A illustrates a schematic diagram of a voltage converter with a control circuit, which includes a peak offset modulation circuit, in accordance with aspects of the disclosure.

FIG. 3A illustrates a schematic diagram of a voltage converter with details of the control circuit 300, which includes a peak offset modulation circuit, in accordance with aspects of the disclosure.

The control circuit 300 of FIG. 3A differs from the control circuit 200 of FIG. 2A, as discussed above, in that rather than adjusting the phase shift between the two phases, the peak current of the Peak Current Mode Control (PCMC) is adjusted by a peak current offset. Again, the difference in the duty cycles $e_d[n]$ is used as input, and then there is a control loop 320 that is configured to output the peak current offset $\delta I_{ref}$, which is used to adjust the peak current of the PCMC.

The peak offset modulation circuit of the control circuit 300 comprises a duty cycle difference determination circuit 310, a control loop 320, and a peak offset selector circuit 330. There is also a known interleaved constant frequency modulator 340. The control loop 320 in this example may alternatively be referred to as a peak offset generator circuit. The duty cycle difference determination circuit 310, the control loop 320, and the interleaved constant frequency modulator 340 are otherwise basically the same as the duty cycle difference determination circuit 210, the control loop 220, and the interleaved constant frequency modulator 240, respectively, of FIG. 2A, and thus their detailed descriptions will not be repeated here.

The peak offset selector circuit 330 comprises an inverter −1 and a multiplexer M, and is configured to select the peak current offset ($\delta I_{ref}$ or $-\delta I_{ref}$) for asymmetric application to the peak reference current within a switching cycle. More specifically, the multiplexer M receives at one of it inputs the generated positive peak current offset $\delta I_{ref}$, and at the other of its inputs the negative peak current offset $-\delta I_{ref}$ from the inverter −1, which inverts the generated peak current offset $\delta I_{ref}$. The generated peak current offset $\delta I_{ref}$ is added asymmetrically in the positive (first) direction or negative (second) direction during a single switching cycle according to which switching circuit is on, the first switching circuit ($A_1$, $B_1$) or the second switching circuit ($A_2$, $B_2$). Which switching circuit ($A_1$, $B_1$), ($A_2$, $B_2$) is on depends on the phase and thus which of the respective duty commands $D_1$, $D_2$ is active. The multiplexer M is configured to select either a positive peak current offset $\delta I_{ref}$ or a negative peak current offset $-\delta I_{ref}$ depending on the phase. If the switching cycle is between zero and $T_s/2$, the second switching circuit ($A_2$, $B_2$) is on, so the peak offset $\delta I_{ref}$ is subtracted from the peak reference current $i_{ref}[n]$. Otherwise, if the switching cycle is between $T_s/2$ and $T_s$, the first switching circuit ($A_1$, $B_1$) is on, so the peak offset $\delta I_{ref}$ is added to the peak reference current $i_{ref}[n]$. The output of the peak offset selector circuit 330 is coupled to an adder A, which introduces the peak current offset $\delta I_{ref}$ to the PCMC.

The peak current offset application is performed according to which switching circuit, ($A_1$, $B_1$) or ($A_2$, $B_2$), is turned on as follows:

$$i_{ref}[n]|_{M<0.5} = i_{ref}[n] - \delta I_{ref}[n] \text{ when } A_2 \text{ is ON, and} \quad \text{(Equation 8)}$$
$$i_{ref}[n] + \delta I_{ref}[n] \text{ when } A_1 \text{ is ON.}$$

$$i_{ref}[n]|_{M>0.5} = i_{ref}[n] + \delta I_{ref}[n] \text{ when } A_2 \text{ is ON, and} \quad \text{(Equation 9)}$$
$$i_{ref}[n] - \delta I_{ref}[n] \text{ when } A_1 \text{ is ON.}$$

Hence, the inherent positive feedback is eliminated and the voltage controller is stabilized. In addition, forcing $$\hat{V}_{fly} = \frac{V_g}{2}$$

balances the flying capacitor voltage $V_{fly}$. The equal value and different sign of the peak current offset within a single switching cycle is to maintain the average of the peak reference current $i_{ref}$ unchanged, which decreases the output voltage regulation degradation. The same technique is adopted here, but instead replacing the flying capacitor and input voltage measurements with determining the duty cycle difference $e_d[n]$, information which is already available inside the controller 300 as shown in FIG. 3A. A peak current offset value $\delta I_{ref}$ is provided by the control loop 320 which regulates the duty cycle difference $e_d[n]$. The duty commands $D_1$, $D_2$ under such conditions are given by:

$$D_1|_{forced,M<0.5} = D_1|_{M<0.5} + \frac{\frac{2\delta I_{ref} L_o f_s}{V_g}\left(0.5 - \frac{\hat{V}_{fly}}{V_g}\right)}{0.25 - M - \left(\frac{\hat{V}_f}{V_g}\right)^2 + \frac{S_e L_o}{V_g}}, \quad \text{(Equation 10)}$$

$$D_2|_{forced,M<0.5} = D_2|_{M<0.5} - \frac{\frac{2\delta I_{ref} L_o f_s}{V_g}\left(0.5 + \frac{\hat{V}_{fly}}{V_g}\right)}{0.25 - M - \left(\frac{\hat{V}_f}{V_g}\right)^2 + \frac{S_e L_o}{V_g}}, \quad \text{(Equation 11)}$$

$$D_1|_{forced,M>0.5} = D_1|_{M>0.5} - \frac{\frac{2\delta I_{ref} L_o f_s}{V_g}\left(0.5 - \frac{\hat{V}_{fly}}{V_g}\right)}{0.75 - M + \left(\frac{\hat{V}_f}{V_g}\right)^2 + \frac{S_e L_o}{V_g}}, \quad \text{(Equation 12)}$$

and $$D_2|_{forced,M>0.5} = D_2|_{M>0.5} + \frac{\frac{2\delta I_{ref} L_o f_s}{V_g}\left(0.5 + \frac{\hat{V}_{fly}}{V_g}\right)}{0.75 - M + \left(\frac{\hat{V}_f}{V_g}\right)^2 + \frac{S_e L_o}{V_g}}. \quad \text{(Equation 13)}$$

The peak current reference modification as shown in Equations 8 and 9 leads to flying capacitor average currents shown below, $$I_{fly}|_{M<0.5} \approx \frac{M\frac{\hat{V}_{fly}}{V_g}}{0.25 - M + \frac{S_e L_o}{V_g}}\left[I_o - \frac{\Delta I_L M}{2(0.5 - M)}\right] - \left[\frac{2\delta I_{ref} L_o f_s}{V_g\left(0.25 - M + \frac{S_e L_o}{V_g}\right)}\right]\left[I_0 - \frac{\Delta I_L M}{2(0.5 - M)}\right], \quad \text{(Equation 14)}$$

and $$I_{fly}|_{M>0.5} \approx \frac{(1-M)\frac{\hat{V}_{fly}}{V_g}}{0.75 - M + \frac{S_e L_o}{V_g}}\left[I_o - \frac{(1-M)\Delta I_L}{2(M - 0.5)}\right] - \left[\frac{2\delta I_{ref} L_o f_s}{V_g\left(0.75 - M + \frac{S_e L_o}{V_g}\right)}\right]\left[I_0 - \frac{(1-M)\Delta I_L}{2(M - 0.5)}\right]. \quad \text{(Equation 15)}$$

As shown, the duty cycle difference $e_d[n]$ based control stabilizes and balances the flying capacitor voltage $V_{fly}$ using the sensorless peak offsetting modulation implementation under the condition:

$$\frac{\Delta I_L}{I_o} < r(M) \quad \text{(Equation 16)}$$

where $r(M)=$ $$\frac{2(0.5 - M)}{M} \text{ when the operating mode } M < 0.5, \quad \text{(Equation 17)}$$

and $$\frac{2(M - 0.5)}{1 - M} \text{ when the operating mode } M > 0.5.$$

Figure 3B:
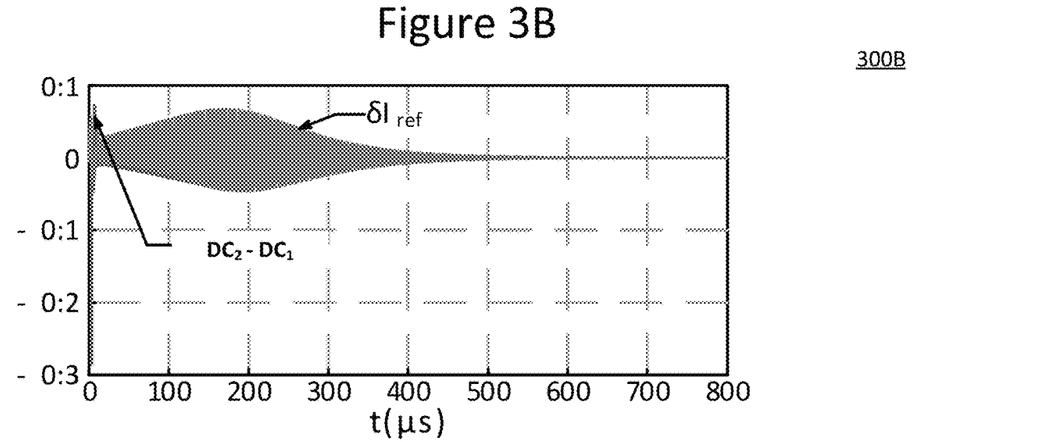
FIGS. 3B-3D illustrate graphs of simulation results of the voltage converter with control circuit of FIG. 3A.
Figure 3C:
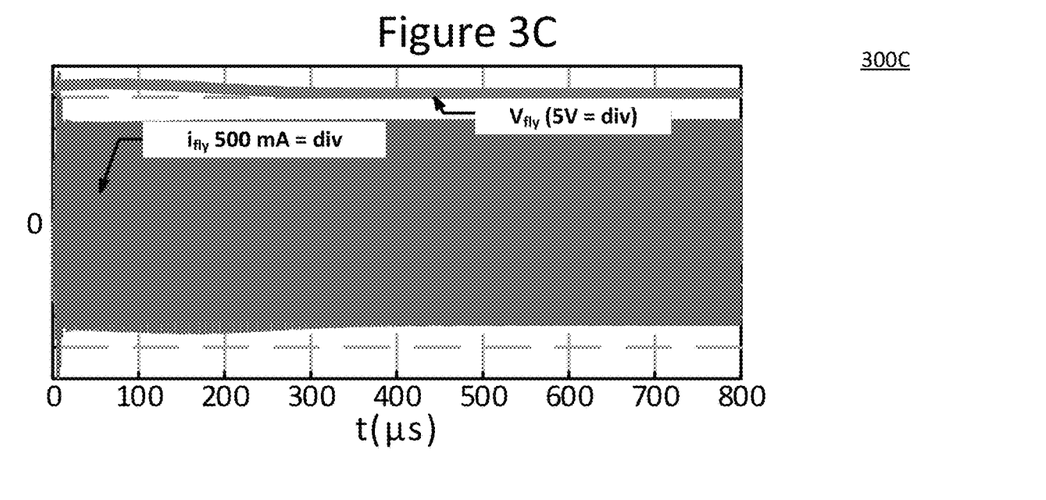
Figure 3D:
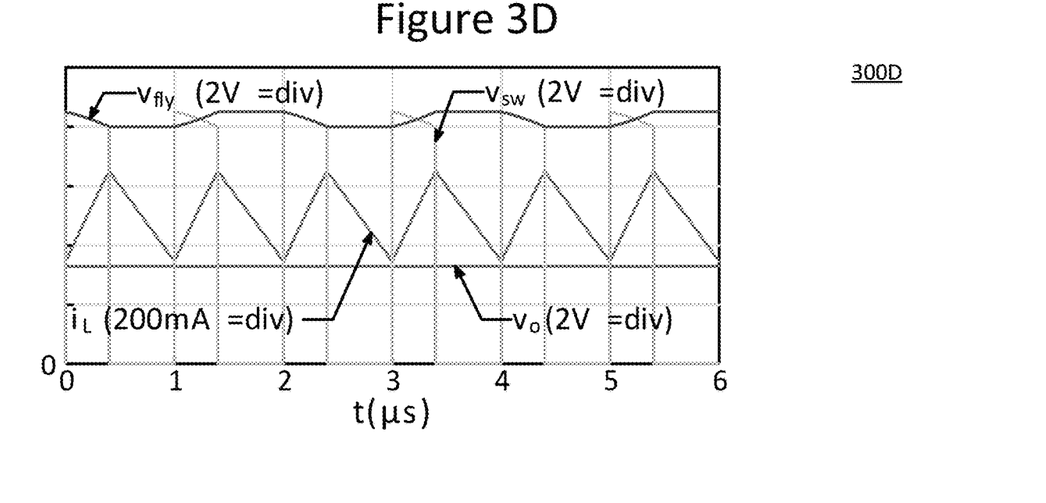

FIGS. 3B-3D illustrate simulation results of the voltage converter with the control circuit 300 of FIG. 3A. FIG. 3B illustrates a graph 300B showing a duty difference $DC_2 - DC_1$ and a peak current offset $\delta I_{ref}$. FIG. 3C illustrates a graph 300C showing flying capacitor voltage $v_{fly}$ and flying capacitor current $i_{fly}$. FIG. 3D illustrates a graph 300D showing steady state waveforms of switching node voltage $v_{sw}$, inductor current $i_L$, output voltage, and flying capacitor voltage $v_{fly}$.

In order to stabilize the voltage controller, the feedback sign is operating mode dependent, as shown in Equations 8 and 9. Apply the peak current offset $\delta I_{ref}$ to regulate the duty cycle difference $e_d[n]$ is verified, as shown in FIG. 3B. At steady state the reference current $\delta I_{ref}$, duty difference $e_d[n]$, and flying capacitor average current tend to go to zero, and the flying capacitor voltage $V_{fly}$ converges to $v_g/2$ as shown in FIG. 3B and FIG. 3C. The stable and balanced operating point is shown in FIG. 3D, where the inductor current $i_L$ and switching node voltage $v_{sw}$ waveforms are periodic with frequency $2f_s$, and the flying capacitor voltage $V_{fly}$ is balanced with a ripple having frequency $f_s$.

Figure 4:
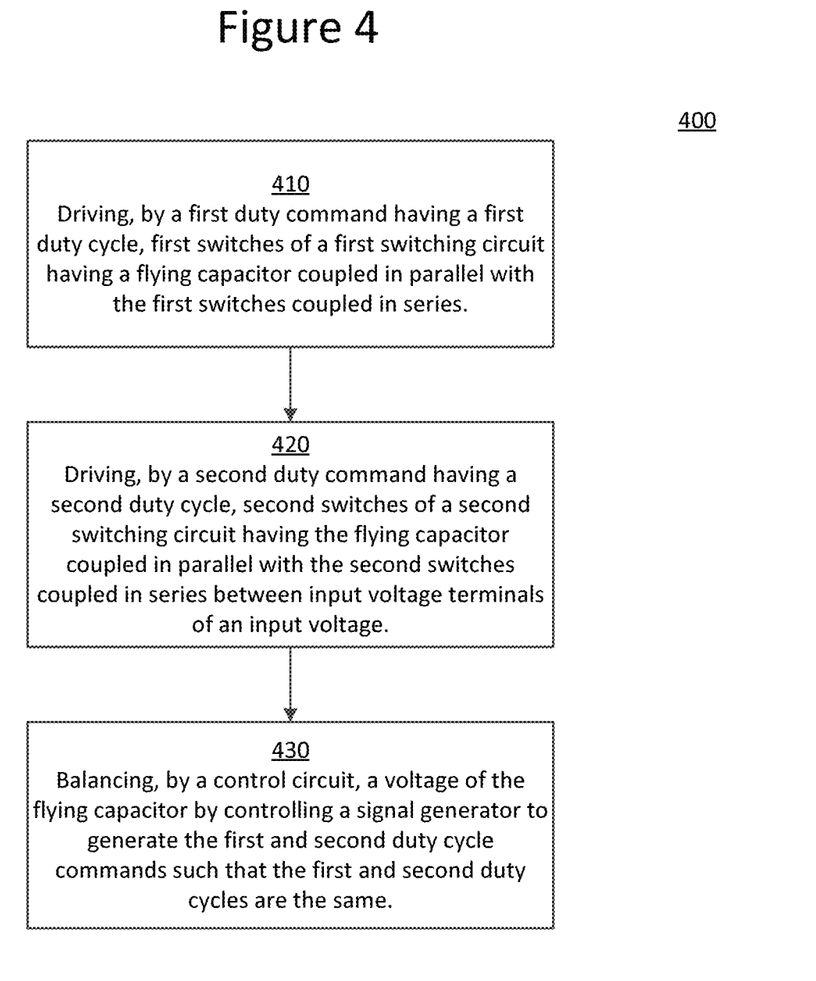
FIG. 4 illustrates a flowchart of a voltage converting method in accordance with aspects of the disclosure.

FIG. 4 illustrates a flowchart of a voltage converting method 400 in accordance with aspects of the disclosure.

At Step 410, driving, by a first duty command $D_1$ having a first duty cycle, first switches $A_1$, $B_1$ of a first switching circuit having a flying capacitor $C_{fly}$ coupled in parallel with the first switches $A_1$, $B_1$ coupled in series.

At Step 420, driving, by a second duty command $D_2$ having a second duty cycle, second switches $A_2$, $B_2$ of a second switching circuit having the flying capacitor $C_{fly}$ coupled in parallel with the second switches $A_2$, $B_2$ coupled in series between input voltage terminals of an input voltage $V_g$.

At Step 430, balancing, by a control circuit 100/200/300, a voltage $V_{fly}$ of the flying capacitor $C_{fly}$ by controlling a interleaved constant frequency modulator 240/340 to generate the first and second duty cycle commands $D_1$, $D_2$ such that the first and second duty cycles are the same.

Aspects of this disclosure rely on replacing flying capacitor voltage sampling with detecting a difference between duty commands $D_1$, $D_2$ induced by a PCMC. The simplified architecture eliminates the ADC, measurement devices, or signal conditioning circuitries required for the flying capacitor voltage measurement. In addition, there is increased reliability due to the input voltage independent operation.

The disclosure is described as addressing flying capacitor voltage imbalance under PCMC. It is also envisioned that the concepts described herein are applicable to address such an imbalance due to a voltage control mode or voltage squared control mode.

The techniques of this disclosure may also be described in the following examples.

Example 1

A multi-level voltage converter, comprising: a first switching circuit including a flying capacitor coupled in parallel with first switches coupled in series, the first switches configured to be driven by a first duty command having a first duty cycle; a second switching circuit including the flying capacitor and second switches coupled in series between input voltage terminals of an input voltage, the second switches configured to be driven by a second duty command having a second duty cycle; and a control circuit configured to balance a voltage of the flying capacitor by controlling a interleaved constant frequency modulator to generate the first and second duty cycle commands such that the first and second duty cycles are the same.

Example 2

The multi-level voltage converter of example 1, wherein when the flying capacitor voltage is balanced, the flying capacitor voltage is equal to a voltage converter input voltage divided by (N-1), where N is a number of voltage levels of the voltage converter.

Example 3

The multi-level voltage converter of any combination of examples 1 and 2, wherein when the flying capacitor voltage is balanced, an average current of the flying capacitor is zero.

Example 4

The multi-level voltage converter of any combination of examples 1-3, wherein the control circuit includes an angle modulation circuit configured to control the interleaved constant frequency modulator by adjusting, based on a duty cycle difference between the first and second duty cycles, a phase angle between the first and second duty commands.

Example 5

The multi-level voltage converter of example 4, wherein the angle modulation circuit comprises: a duty cycle difference determination circuit configured to determine the duty cycle difference; and a synchronization signal generator configured to generate first and second synchronization signals to control the interleaved constant frequency modulator to generate the respective first and second duty commands, and to delay the second synchronization signal by a delay time corresponding with the duty cycle difference.

Example 6

The multi-level voltage converter of example 5, wherein the angle modulation circuit comprises: a control loop configured to generate the delay time based on the duty cycle difference.

Example 7

The multi-level voltage converter of any combination of examples 1-6, wherein the control circuit includes a peak offset modulation circuit configured to control the interleaved constant frequency modulator by generating, based on a duty cycle difference between the first and second duty cycles, a peak current offset for a peak reference current of Peak Current Mode Control (PCMC).

Example 8

The multi-level voltage converter of any combination of examples 1-7, wherein the peak offset modulation circuit comprises: a peak offset generator circuit configured to generate the peak current offset based on the duty cycle difference; and a peak offset selector circuit configured to select the generated peak current offset based on which of the first and second duty commands is active.

Example 9

The multi-level voltage converter of any combination of examples 1-8, wherein the peak offset selector circuit is configured to select the peak current offset for asymmetric application to the peak reference current within a switching cycle.

Example 10

The multi-level voltage converter of any combination of examples 1-9, wherein the peak offset selector circuit is configured to select the peak current offset to adjust the peak reference current by the peak current offset in a first direction when the first duty command is active, and in a second direction opposing the first direction when the second duty command is active.

Example 11

A method of multi-level voltage converting, comprising: driving, by a first duty command having a first duty cycle, first switches of a first switching circuit having a flying capacitor coupled in parallel with the first switches coupled in series; driving, by a second duty command having a second duty cycle, second switches of a second switching circuit having the flying capacitor and the second switches coupled in series between input voltage terminals of an input voltage; and balancing, by a control circuit, a voltage of the flying capacitor by controlling a interleaved constant frequency modulator to generate the first and second duty cycle commands such that the first and second duty cycles are the same.

Example 12

The method of example 11, wherein when the flying capacitor voltage is balanced, the flying capacitor voltage is equal to a voltage converter input voltage divided by (N−1), where N is a number of voltage levels of the voltage converter.

Example 13

The method of any combination of examples 11 and 12, wherein when the flying capacitor voltage is balanced, an average current of the flying capacitor is zero.

Example 14

The method of any combination of examples 11-13, further comprising: controlling, by the control circuit which includes an angle modulation circuit, the interleaved constant frequency modulator by adjusting, based on a duty cycle difference between the first and second duty cycles, a phase angle between the first and second duty commands.

Example 15

The method of example 14, further comprising: determining, by a duty cycle difference determination circuit within the angle modulation circuit, the duty cycle difference; generating, by a synchronization signal generator within the angle modulation circuit, first and second synchronization signals for controlling the interleaved constant frequency modulator to generate the respective first and second duty commands; and delaying, by the synchronization signal generator, the second synchronization signal by a delay time corresponding with the duty cycle difference.

Example 16

The method of example 15, further comprising: generating, by a control loop within the angle modulation circuit, the delay time based on the duty cycle difference.

Example 17

The method of any combination of examples 11-16, further comprising: controlling, by the control circuit which includes a peak offset modulation circuit, the interleaved constant frequency modulator by generating, based on a duty cycle difference between the first and second duty cycles, a peak current offset for a peak reference current of Peak Current Mode Control (PCMC).

Example 18

The method of any combination of examples 11-17, further comprising: generating, by a peak offset generator circuit within the peak offset modulation circuit, the peak current offset based on the duty cycle difference; and selecting, by a peak offset generator circuit within the peak offset modulation circuit, the generated peak current offset based on which of the first and second duty commands is active.

Example 19

The method of any combination of examples 11-18, further comprising: selecting, by the peak offset selector circuit, the peak current offset for asymmetric application to the peak reference current within a switching cycle.

Example 20

The method of any combination of examples 1-19, further comprising: selecting, by the peak offset selector circuit, the peak current offset to adjust the peak reference current by the peak current offset in a first direction when the first duty command is active, and in a second direction opposing the first direction when the second duty command is active.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. For example the aspect of the disclosure may be implemented non-digitally, bipolar transistors (e.g., PNP or NPN) may be used instead of MOS transistors, a PNP may be used instead of NPN, and/or a PMOS may be used instead of NMOS. This disclosure is intended to cover any adaptations or variations of the specific embodiments discussed herein.

What is claimed is:

1. A multi-level voltage converter, comprising:
   a first switching circuit including a flying capacitor coupled in parallel with first switches coupled in series, the first switches configured to be driven by a first duty command having a first duty cycle;
   a second switching circuit including the flying capacitor and second switches coupled in series between input voltage terminals of an input voltage, the second switches configured to be driven by a second duty command having a second duty cycle; and
   a control circuit configured to balance a voltage of the flying capacitor by controlling an interleaved constant frequency modulator to generate the first and second duty cycle commands such that the first and second duty cycles are the same, wherein the control circuit includes a peak offset modulation circuit configured to control the interleaved constant frequency modulator by generating, based on a duty cycle difference between the first and second duty cycles, a peak current offset for a peak reference current of Peak Current Mode Control (PCMC).

2. The multi-level voltage converter of claim 1, wherein when the flying capacitor voltage is balanced, the flying capacitor voltage is equal to a voltage converter input voltage divided by (N−1), where N is a number of voltage levels of the voltage converter.

3. The multi-level voltage converter of claim 1, wherein when the flying capacitor voltage is balanced, an average current of the flying capacitor is zero.

4. The multi-level voltage converter of claim 1, wherein the peak offset modulation circuit comprises:
   a peak offset generator circuit configured to generate the peak current offset based on the duty cycle difference; and
   a peak offset selector circuit configured to select the generated peak current offset based on which of the first and second duty commands is active.

5. The multi-level voltage converter of claim 4, wherein the peak offset selector circuit is configured to select the peak current offset for asymmetric application to the peak reference current within a switching cycle.

6. The multi-level voltage converter of claim 4, wherein the peak offset selector circuit is configured to select the peak current offset to adjust the peak reference current by the peak current offset in a first direction when the first duty command is active, and in a second direction opposing the first direction when the second duty command is active.

7. A multi-level voltage converter, comprising:
   a first switching circuit including, a flying capacitor coupled in parallel with first switches coupled in series, the first switches configured to be driven by a first duty command having a first duty cycle;
   a second switching circuit including the flying capacitor and second switches coupled in series between input voltage terminals of an input voltage, the second switches configured to be driven by a second duty command having a second duty cycle; and
   a control circuit configured to balance a voltage of the flying capacitor by controlling an interleaved constant frequency modulator to generate the first and second duty cycle commands such that the first and second duty cycles are the same, wherein the control circuit includes an angle modulation circuit configured to control the interleaved constant frequency modulator by adjusting, based on a duty cycle difference between the first and second duty cycles, a flexible phase angle between the first and second duty commands.

8. The multi-level voltage converter of claim 7, wherein the angle modulation circuit comprises:
   a duty cycle difference determination circuit configured to determine the duty cycle difference; and
   a synchronization signal generator configured to generate first and second synchronization signals to control the interleaved constant frequency modulator to generate the respective first and second duty commands, and to delay the second synchronization signal by a delay time corresponding with the duty cycle difference.

9. The multi-level voltage converter of claim 8, wherein the angle modulation circuit comprises:
   a control loop configured to generate the delay time based on the duty cycle difference.

10. A method of multi-level voltage converting, comprising:
    driving, by a first duty command having a first duty cycle, first switches of a first switching circuit having a flying capacitor coupled in parallel with the first switches coupled in series;
    driving, by a second duty command having a second duty cycle, second switches of a second switching circuit having the flying capacitor and the second switches coupled in series between input voltage terminals of an input voltage;
    balancing, by a control circuit, a voltage of the flying capacitor by controlling an interleaved constant frequency modulator to generate the first and second duty cycle commands such that the first and second duty cycles are the same; and controlling, by the control circuit which includes a peak offset modulation circuit, the interleaved constant frequency modulator by generating, based on a duty cycle difference between the first and second duty cycles, a peak current offset for a peak reference current of Peak Current Mode Control (PCMC).

11. The method of claim 10, wherein when the flying capacitor voltage is balanced, the flying capacitor voltage is equal to a voltage converter input voltage divided by (N−1), where N is a number of voltage levels of the voltage converter.

12. The method of claim 10, wherein when the flying capacitor voltage is balanced, an average current of the flying capacitor is zero.

13. The method of claim 10, further comprising:
generating, by a peak offset generator circuit within the peak offset modulation circuit, the peak current offset based on the duty cycle difference; and selecting, by a peak offset generator circuit within the peak offset modulation circuit, the generated peak current offset based on which of the first and second duty commands is active.

14. The method of claim 13, further comprising:
selecting, by the peak offset selector circuit, the peak current offset for asymmetric application to the peak reference current within a switching cycle.

15. The method of claim 13, further comprising:
selecting, by the peak offset selector circuit, the peak current offset to adjust the peak reference current by the peak current offset in a first direction when the first duty command is active, and in a second direction opposing the first direction when the second duty command is active.

* * * * *